United States Patent Office.

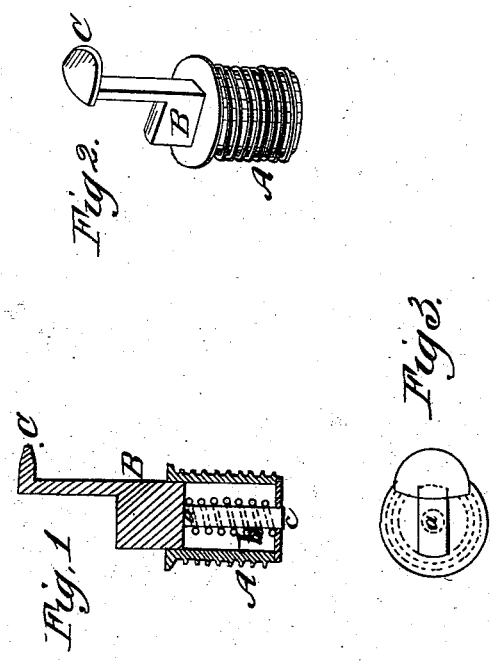
F. Babcock,
Sash Fastener,
Nº 82,580.  Patented Sept. 29, 1868.
Witnesses.
Samuel S. Warner
S. A. Robinson.
Inventor.
Franklin Babcock.

FRANKLIN BABCOCK, OF MIDDLETOWN, CONNECTICUT.

Letters Patent No. 82,580, dated September 29, 1868.

IMPROVEMENT IN SASH-HOLDERS.

The Schedule referred to in these Letters Patent and making part of the same.

TO ALL WHOM IT MAY CONCERN:

Be it known that I, FRANKLIN BABCOCK, of Middletown, county of Middlesex, and State of Connecticut, have invented a new and improved Window-Spring Catch; and I do hereby declare that the following is a full and exact description, reference being had to the accompanying drawings.

Figure 1 is a sectional view;

Figure 2 is a perspective view, and

Figure 3 an end view.

To enable others skilled in the art to make and use my invention, I will proceed to describe its construction and operation.

I make a cylindrical shell-case, having a screw cut on its outer periphery, for the purpose of screwing it fast to the window-frame, the hole being bored to the proper size, which is easily applied, and held more secure than other springs now used.

The thumb-catch, at $a$, being round, and having a spiral spring, B, around it, it is held securely inside the shell. The stem $a$ passing through the bottom of the shell $c$, is riveted so as to prevent its being forced out of its place by the spring. The novelty of my invention is that it is cheap, durable, and compact in form, and easily applied to the window-frame.

I am aware that the catch herein shown and described, when the several component parts are taken separately, is not new. My invention consists in the combination of the devices specified for forming a neat, practical, and economical device, for the purposes set forth.

What I claim, is—

The combination of the screw-socket A, sliding shoulder B with flange C, stem $a$, and spring $b$, all as and for the purposes set forth.

FRANKLIN BABCOCK.

Witnesses:
SAMUEL L. WARNER,
SAMUEL C. HUBBARD.